United States Patent [19]

Breer

[11] 4,099,652

[45] Jul. 11, 1978

[54] APPARATUS FOR MIXING FLUID COMPONENTS WHICH REACT QUICKLY WITH ONE ANOTHER TO FORM A BLOWABLE, FOAM-FORMING MIXTURE

[75] Inventor: Karl Breer, Cologne, Germany

[73] Assignee: Bayer Aktiengesellschaft, Leverkusen, Germany

[21] Appl. No.: 463,021

[22] Filed: Apr. 22, 1974

Related U.S. Application Data

[63] Continuation of Ser. No. 209,380, Dec. 17, 1971, abandoned, which is a continuation of Ser. No. 885,774, Dec. 17, 1969, abandoned.

[30] Foreign Application Priority Data

Jan. 23, 1969 [DE] Fed. Rep. of Germany ....... 1903243

[51] Int. Cl.² .............................................. B67D 5/08
[52] U.S. Cl. ...................................... 222/135; 222/23

[58] Field of Search .................. 222/23, 70, 135, 145; 137/624.11; 58/145 R, 39.5, 42, 74

[56] References Cited

U.S. PATENT DOCUMENTS

| 3,088,270 | 5/1963 | King | 58/39.5 |
|---|---|---|---|
| 3,100,506 | 8/1963 | Breer | 137/567 |

*Primary Examiner*—Allen N. Knowles
*Assistant Examiner*—Joseph J. Rolla
*Attorney, Agent, or Firm*—Burgess, Dinklage & Sprung

[57] ABSTRACT

For the production of foam-articles a mixing chamber is used for mixing the fluid reaction components, wherein at least one of the supply pipes is provided with an adjustable liquid storage arrangement for synchronizing the opening points of the inlet valves, which are connected with a timing instrument, which is connected on the other hand with a contact maker for adjusting the pivot of the liquid storage arrangement in such a way that the inlet components enter into the mixing chamber at the same time.

3 Claims, 3 Drawing Figures

APPARATUS FOR MIXING FLUID COMPONENTS WHICH REACT QUICKLY WITH ONE ANOTHER TO FORM A BLOWABLE, FOAM-FORMING MIXTURE

This application is a continuation of Ser. No. 209,380 filed Dec. 17, 1971, now abandoned, which is a continuation of Ser. No. 885,774 filed Dec. 17, 1969, now abandoned.

The present invention relates to an apparatus by which fluid components which react quickly with one another are mixed to form a blowable, foam-forming mixture. The invention is particularly concerned with the production of polyurethane foam materials. The apparatus of the invention comprises a mixing chamber with an outlet nozzle and a number of supply pipes corresponding to the number of the components to be supplied to the mixing chamber, the pipes having inlet valves operating automatically according to the delivery pressures of the components. A liquid storage arrangement is provided in at least one of the supply pipes, the arrangement comprising a piston which is arranged to be freely movable in a bore of a housing, the piston being acted upon at one of its ends by the liquid and being sprung at its other end. An adjustable stop pin for the piston is provided in the longitudinal axis of the latter and spaced from the end of the piston on the spring side, the displacement of the liquid-loaded piston in the bore being limited by the displacement of said pin.

In order to produce a satisfactory foam material product, it is necessary for the components which are to be mixed and which react with one another during the mixing to enter the mixing chambers simultaneously, especially when using mixing chambers having a small volume and when there is a short residence time of the mixture in the mixing chamber. The inlet valves of known apparatus are equipped with automatically operating and preferably spring-loaded valves operating in the same or reverse directions. Since the inlet valves are consequently opened and closed in dependence on the delivery pressures of the components, there can be a lead or a lag of one of the reactive components. This phenomenon causes defects in the form of holes in the finished product. When producing finished articles with a visible surface, such as instrument panels, there are consequently many rejects.

Attempts have already been made to avoid this disadvantage of the lead or lag by using the liquid storage arrangement initially referred to. This was successful, but the time required for synchronising the entry of the components into the mixing chamber was very long.

When using this known arrangement, it was first established by producing foam plastic test elements whether the components were flowing simultaneously into the mixing chamber. In order to achieve simultaneous entry of the components, it was often necessary to produce a number of test elements until a satisfactory surface indicated the simultaneous entry of the components into the mixing chamber. This method of adjustment is indeed effective, but it is very complicated and requires a very sensitive and delicate touch on the part of the operating personnel.

The object of the invention is to provide an apparatus with which the simultaneous entry of the components into the mixing chamber can be achieved substantially more quickly and more reliably.

This object is obtained according to the invention by the inlet valves being connected by way of contact-making devices with a time-indicating instrument for establishing the opening times of the valves.

This time-indicating instrument gives the difference in the opening times from one inlet valve to another or the deviation from a prescribed zero point. On the basis of the indicated time difference, the operating personnel can adjust the stop pin for the piston in the liquid storage arrangement. As regards the different components, it is possible on the basis of empirically established curves to adjust the stop pin or pins by distance corresponding to the associated time difference. The effect achieved in this way is that the control of the components for producing a simultaneous entry into the mixing chamber can be regulated by the apparatus being switched on once.

According to a further development of the invention, the timing instrument is connected through a pulse transmitter to those setting pins of the piston of the liquid storage arrangement which are arranged in the supply pipes.

The effect obtained in this way is that each setting pin is correctly adjusted automatically from the indicating instrument. In this case, also, it is first necessary to establish empirically the dependence of the time difference on the path of adjustment. The pulse transmitter then has to be adjusted according to this dependence.

The timing instrument consists of a normal commercial timer clock, which responds immediately with the opening of the inlet valves. The contact is, for example, made mechanically, pneumatically, hydraulically or by induction. A number of solutions which are known per se are available to the expert for use for this purpose, and these solutions consequently are not themselves a subject of the invention.

The invention is now illustrated diagrammatically and by way of example in a drawing, wherein:

FIG. 3 is a cross-sectional view of a liquid storage arrangement as can be used according to the invention.

Figure 1:
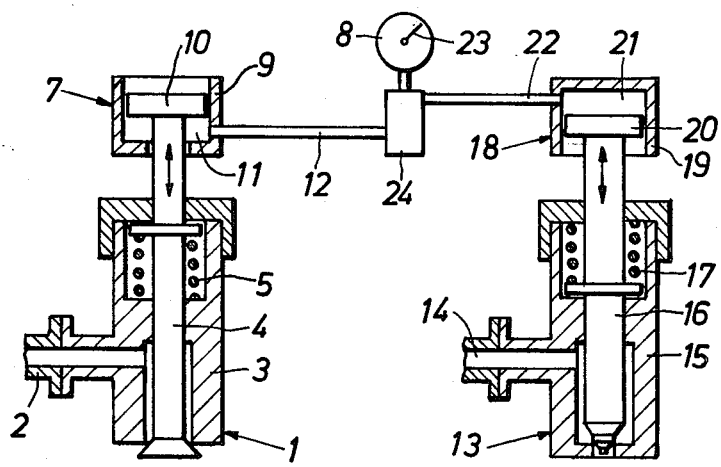
FIG. 1 shows two inlet valves, one of which is constructed as a unidirectional flow nozzle and the other, simply for demonstration purposes, as a counter-current nozzle, the valves being shown in section.

In FIG. 1, an inlet valve 1 is connected to a supply pipe 2. It consists of a valve housing 3 and a valve 4, which is under the pressure of the spring 5, on the one hand, and, under the oppositely directed pressure of the components to be injected, on the other hand. The timing instrument consists essentially of a contact maker 7, which is provided in the region of the end of the valve stem, and a clock 8. In the present case, the contact maker 7 consists of a pneumatically operated piston 10 moving in a housing 9. The pressure chamber 11 is connected through a pressure pipe 12 to the clock 8. An inlet valve 13 for the second component is flanged on to the supply pipe 14 and consists of a valve housing 15 and the valve 16, which is formed as a counter-current nozzle. A spring 17 holds the nozzle opening closed until the pressure of the component exceeds that of the spring 17. The valve 16 then opens, and through the contact maker 18, which consists of a pneumatically operating piston 20 which is displaceable in a housing 19 and which is arranged on the end of the stem of the valve 16, the pressure chamber 21 is likewise connected through a pressure pipe 22 to the clock 8.

The inlet valves 1 and 13 act on an indicating pointer 23 of the clock 8. The pulse delivered through the pressure pipe 12 by the inlet valve 1 with the opening thereof starts the clock 8, the indicating pointer 23 moving like the hand of a clock from the zero position. If the inlet valve 13 opens, a second pulse is delivered to the clock 8 through the associated pressure pipe 22. This pulse switches off the movement of the pointer 23. The "lead" of the component flowing in through the inlet valve 1 can now be read off in time units from the position of the pointer 23. Arranged in front of the clock 8 is a control instrument which, in the event of the component flowing in through the inlet valve 13 having a "lead", and contrary to the working procedure previously described, passes on the pulse given through the pressure pipe 22 in such a way that the said pulse moves the pointer 23 in the opposite direction. The second pulse, delivered through the pressure pipe 12, then stops the movement of the pointer. The effect achieved in this way is that the clock 8 not only indicates the lead or lag time, but also which of the two components is leading or lagging.

If the time of entry of three or more components is to be synchronised, then it is consequently necessary to use a clock which meets these requirements, that is to say, one of the inlet valves is set as the zero point as regards its moment of opening and the differences in time as regards the moments of opening the other inlet valves must be with reference to this point. Consequently, the construction of the clock for synchronising more than two components is correspondingly complicated.

Figure 2:
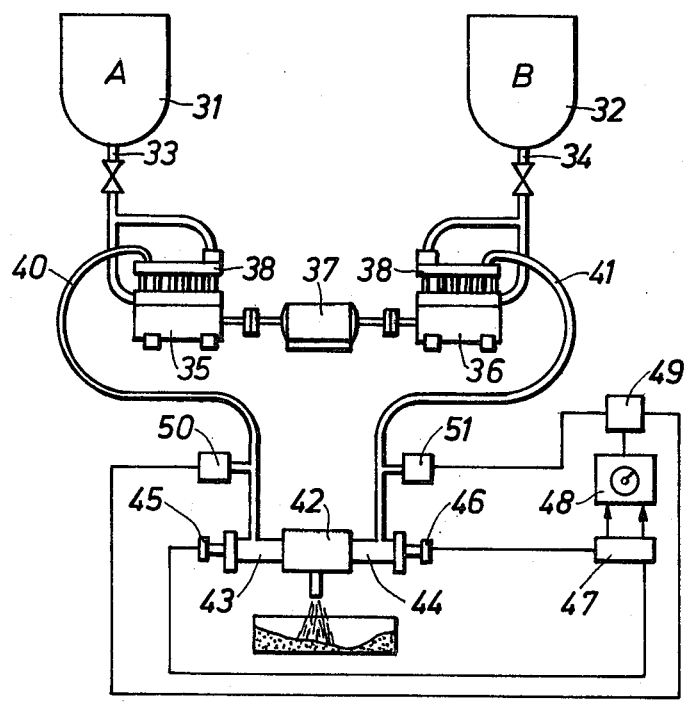
FIG. 2 is an automatically operating apparatus.

According to FIG. 2, the components A and B flow from storage containers 31 and 32 through the delivery pipes 33 and 34 to the suction sides of pumps 35 and 36, which are driven by a motor 37. On the pressure side, the pumps comprise header units 38 and 39, from which supply pipes 40 and 41 extend to the mixing chamber 42. The supply pipes 40 and 41 open into the inlet valves 43 and 44. These are provided with measurement positions 45 and 46, the pulses of which are supplied through a pulse transmitter 47 to a timing instrument 48. The latter is constructed as a pulse converter and control unit and, on the basis of the stored pulses, delivers an outgoing pulse to a following pulse transmitter 49. The transmitter 49, according to the lead of one of the two components A or B, either acts on a liquid storage arrangement 50 disposed on the supply pipe 40 or a liquid storage arrangement 51 provided in the supply pipe 41 by regulating their adjustable stop pins.

Referring to FIG. 3, therein the sturcture of the liquid storage arrangement 50 is shown. The storage arrangement 50 is connected to supply pipe 40 via conduit 61. The arrangement comprises a piston 62, freely movable in the bore of housing 63. The piston is acted on at one end by the liquid and by a spring 64 at its other end. An adjustable stop pin 65 is spaced from the end of the piston on the spring side. The displacement of the liquid-loaded piston in the bore of housing 63 is limited by displacement of pin 65.

I claim:

1. In apparatus suitable for mixing two fluid components which react quickly with each other forming foam, comprising:
   (a) a pump for each component, and means for simultaneously operating said pumps,
   (b) a mixing chamber for receiving, mixing, and discharging the components for reaction thereof,
   (c) a conduit between each pump and the mixing chamber for delivery of the components from the pumps to the mixing chamber,
   (d) a valve in each conduit between the pump and the mixing chamber and responsive to pump discharge pressure to open when exposed to a selected pump discharge pressure, for the introduction of the components into the mixing chamber,
   (e) a liquid storage arrangement in at least one of said conduits between the pump and the valve thereof, adjusting means for limiting displacement by said liquid in the liquid storage arrangement for obtaining simultaneous entry of said components into the mixing chamber,
the improvement which comprises:
   (f) a timer for sensing the time interval between opening of the valves,
   (g) means interconnecting the inlet valves and the timer effective to actuate the timer upon opening of the first of the valves to open and inactivate the timer upon opening of the other valve, the interconnecting means comprising pneumatic means for pneumatically transmitting pulses corresponding to operation of the valves, to the time for actuation of the timer and inactivation of the timer,
whereby the timing of the opening of the valves is indicated for adjusting the liquid storage arrangement for said simultaneous entry.

2. Apparatus according to claim 1, each of said valves comprising a valve stem movable for opening of the valve, said pneumatic means comprising a pneumatic piston-cylinder arrangement for each valve having the piston mounted on its valve stem for movement thereof upon movement of the valve stem for generating said pulses.

3. Apparatus according to claim 2, said liquid storage arrangement comprising a piston-cylinder combination, the piston being acted on at one end by the liquid and being spring loaded at its other end, said adjusting means comprising an adjustable stop pin for the combination on the spring loaded side of the piston for selectively limiting displacement of the piston in response to pressure of the liquid.

* * * * *